United States Patent
Xiang et al.

(10) Patent No.: US 10,742,044 B2
(45) Date of Patent: Aug. 11, 2020

(54) EQUALIZATION CONTROL METHOD, APPARATUS, AND CIRCUIT FOR POWER BATTERY

(71) Applicant: BEIJING ELECTRIC VEHICLE CO., LTD., Beijing (CN)

(72) Inventors: Jin Xiang, Beijing (CN); Huigen Yu, Beijing (CN); Zhongke Yang, Beijing (CN); Jun Sheng, Beijing (CN)

(73) Assignee: BEIJING ELECTRIC VEHICLE CO., LTD., Beijing (CN)

( * ) Notice: Subject to any disclaimer, the term of this patent is extended or adjusted under 35 U.S.C. 154(b) by 316 days.

(21) Appl. No.: 15/770,037

(22) PCT Filed: Oct. 25, 2016

(86) PCT No.: PCT/CN2016/103312
§ 371 (c)(1),
(2) Date: Apr. 20, 2018

(87) PCT Pub. No.: WO2017/084474
PCT Pub. Date: May 26, 2017

(65) Prior Publication Data
US 2018/0316196 A1  Nov. 1, 2018

(30) Foreign Application Priority Data
Nov. 17, 2015 (CN) .......................... 2015 1 0791921

(51) Int. Cl.
*H01M 10/44* (2006.01)
*H01M 10/46* (2006.01)
(Continued)

(52) U.S. Cl.
CPC ......... *H02J 7/0014* (2013.01); *H01M 10/425* (2013.01); *H01M 10/4207* (2013.01);
(Continued)

(58) Field of Classification Search
CPC ...... H02J 7/0026; H02J 7/0021; H02J 7/0014; H02J 7/0016
(Continued)

(56) References Cited

U.S. PATENT DOCUMENTS

| 2011/0127962 | A1* | 6/2011 | Murao | .................. H02J 7/0016 320/118 |
| 2011/0127963 | A1* | 6/2011 | Murao | ..................... B60L 58/22 320/118 |
| 2011/0241622 | A1* | 10/2011 | Li | ....................... H01M 10/482 320/116 |

FOREIGN PATENT DOCUMENTS

| CN | 101740827 | 6/2010 |
| CN | 102064586 | 5/2011 |

(Continued)

OTHER PUBLICATIONS

International Search Report for PCT/CN2016/103312, dated Jan. 20, 2017.
(Continued)

*Primary Examiner* — Edward Tso
(74) *Attorney, Agent, or Firm* — B. Aaron Schulman, Esq.; Stites & Harbison, PLLC

(57) ABSTRACT

Disclosed are equalization control method, apparatus and circuit for a power battery. The equalization control method includes: detecting a to-be-equalized cell in the power battery satisfying a preset equalization starting condition, and starting to perform an equalization on the to-be-equalized cell; in a process of performing the equalization on the to-be-equalized cell, determining whether the to-be-equalized cell satisfies an equalization stopping condition; when it is determined that the to-be-equalized cell satisfies the equalization stopping condition, stopping performing the equalization on the to-be-equalized cell, and when the to-be-equalized cell satisfies an equalization continuing con-
(Continued)

dition, continuing to perform the equalization on the to-be-equalized cell; and when it is determined that the to-be-equalized cell does not satisfy the equalization stopping condition, continuing performing the equalization on the to-be-equalized cell, and finishing the equalization until the time period during which the equalization is performed on the to-be-equalized cell satisfies the equalization time calculated value.

20 Claims, 4 Drawing Sheets

(51) Int. Cl.
*H02J 7/00* (2006.01)
*H01M 10/42* (2006.01)
*H01M 10/48* (2006.01)

(52) U.S. Cl.
CPC ......... *H01M 10/482* (2013.01); *H02J 7/0021* (2013.01); *H02J 7/0069* (2020.01); *H01M 2010/4271* (2013.01); *H01M 2220/20* (2013.01)

(58) Field of Classification Search
USPC ................. 320/107, 116, 118, 119, 132, 149
See application file for complete search history.

(56) References Cited

FOREIGN PATENT DOCUMENTS

| CN | 102361100 | 2/2012 |
| CN | 104795857 A | 7/2015 |
| CN | 105449295 | 3/2016 |

OTHER PUBLICATIONS

Written Opinion of the International Searching Authority for PCT/CN2016/103312, dated Jan. 16, 2017.
Office action from SIPO for CN application 201510791921.9.
English translation of office action from SIPO for CN application 201510791921.9.

* cited by examiner

EQUALIZATION CONTROL METHOD, APPARATUS, AND CIRCUIT FOR POWER BATTERY

CROSS-REFERENCE TO RELATED APPLICATION

This application a national phase application of international Application No. PCT/CN2016/103312, filed on Oct. 25, 2016, which claims the priority of China Patent Application No. "201510791921.9" filed on Nov. 17, 2015 by BEIJING ELECTRIC VEHICLE CO., LTD. and entitled "Power battery equalization control method, apparatus and circuit".

FIELD

The present disclosure relates to a battery field, and more particularly relates to an equalization control method for a power battery, an equalization control apparatus for a power battery and an equalization control circuit for a power battery.

BACKGROUND

In recent years, the pace of large-scale popularization of new energy vehicles has become increasingly faster. As a core component of the new energy vehicles, the power battery system has a direct impact on the performance of the vehicle. The power battery system is composed of a plurality of power battery cells connected in series. Due to the limitation of the process conditions and differences in the characteristics of the battery itself, there may be differences in electric quantity or voltage between the battery cells. After multiple cycles of charging and discharging, the differences in the electric quantity and the voltage of the cells becomes larger and larger. As a result, a charging/discharging capacity of the power battery system becomes smaller and smaller, thereby directly affecting the operational performance and the lifetime of the power battery. Therefore, the electric quantity and the voltage of the power battery in an equalizing state may improve the charging/discharging performance and the service lifetime of the power battery. At present, common-used battery equalization methods include active equalization and passive equalization. The active equalization is also known as lossless equalization, which transfers electric quantity from a battery cell with high electric quantity to a battery cell with low electric quantity, or supplements the battery cell with low electric quantity by external energy. The active equalization has an advantage of high equalization efficiency, but the active equalization system is relative complicated and has a high cost, and there is less practical application at present. The passive equalization, also known as lossy equalization, makes the surplus electric quantity in the battery cell with high electric quantity to be discharged by connecting resistors in parallel. The equalization efficiency of the passive equalization is lower than that of the active equalization. However, the passive equalization has a simple circuit structure, a low cost and a wide range of practical applications.

A power battery passive equalization system in prior art generally monitors an open-circuit voltage of the power battery cell in a standing state in real time after the charging of the power battery is finished, and determines a to-be-equalized battery cell in real time and achieves the equalization of the battery system. A target of the equalization is a difference between the open-circuit voltages of the battery cells satisfying a required value, while the passive equalization function generally does not work during the charging/discharging process of the battery. Since the equalization is performed only during a standing process of the power battery, the equalization time is too short, leading to a low equalization efficiency.

In view of the above problems, no effective solution has been proposed.

SUMMARY

Embodiments of the present disclosure provide an equalization control method, apparatus and circuit for a power battery, at least to solve a technical problem of low equalization efficiency of the power battery.

According to an aspect of embodiments of the present disclosure, an equalization control method for a power battery is provided. The equalization control method for the power battery includes: detecting a to-be-equalized cell in the power battery satisfying a preset equalization starting condition, and starting to perform an equalization on the to-be-equalized cell; in a process of performing the equalization on the to-be-equalized cell, determining whether the to-be-equalized cell satisfies an equalization stopping condition; when it is determined that the to-be-equalized cell satisfies the equalization stopping condition, stopping performing the equalization on the to-be-equalized cell, and when the to-be-equalized cell satisfies an equalization continuing condition, continuing to perform the equalization on the to-be-equalized cell, and finishing the equalization until a time period during which the equalization is performed on the to-be-equalized cell satisfies an equalization time calculated value, in which the equalization time calculated value indicates a time period required for performing the equalization on the to-be-equalized cell; and when it is determined that the to-be-equalized cell does not satisfy the equalization stopping condition, continuing performing the equalization on the to-be-equalized cell, and finishing the equalization until the time period during which the equalization is performed on the to-be-equalized cell satisfies the equalization time calculated value.

According to another aspect of embodiments of the present disclosure, an equalization control circuit for a power battery is provided. The equalization control circuit includes: a battery state monitoring loop, coupled to the power battery, configured to monitor SoC values of cells in the power battery; an equalization loop, coupled to the cells in the power battery in series, configured to perform an equalization on a to-be-equalized cell in the power battery; a timer, configured to calculate a time period during which the equalization is performed on the to-be-equalized cell; and a control unit, coupled to the battery state monitoring loop, the equalization loop, the timer and the power battery, configured to: control the equalization loop to perform the equalization on the to-be-equalized cell according to data monitored by the battery state monitoring loop and the time period during which the equalization is performed on the to-be-equalized cell; when it is determined that the to-be-equalized cell satisfies an equalization stopping condition, switch off the equalization loop so as to stop performing the equalization on the to-be-equalized cell and switch on the equalization loop so as to continue to perform the equalization on the to-be-equalized cell when it is determined that the to-be-equalized cell satisfies an equalization continuing condition, and finish the equalization until the time period during which the equalization is performed on the to-beequalized cell satisfies an equalization time calculated value, in which the equalization time calculated value indicates a time period required for performing the equalization on the to-be-equalized cell; when it is determined that the to-be-equalized cell does not satisfy the equalization stopping condition, switch on the equalization loop so as to continue performing the equalization on the to-be-equalized cell, and finish the equalization until the time period during which the equalization is performed on the to-be-equalized cell satisfies the equalization time calculated value.

According to yet another aspect of embodiments of the present disclosure, an equalization control apparatus for a power battery is provided. The equalization control apparatus includes: a detecting unit, configured to detect a to-be-equalized cell in the power battery satisfying a preset equalization starting condition, and to start to perform an equalization on the to-be-equalized cell; a determining unit, configured to determine whether the to-be-equalized cell satisfies an equalization stopping condition in a process of performing the equalization on the to-be-equalized cell; a first control unit and a second control unit, in which, when it is determined that the to-be-equalized cell satisfies the equalization stopping condition, the first control unit is configured to: stop performing the equalization on the to-be-equalized cell, and when the to-be-equalized cell satisfies an equalization continuing condition, continue to perform the equalization on the to-be-equalized cell, and finish the equalization until a time period during which the equalization is performed on the to-be-equalized cell satisfies an equalization time calculated value, in which the equalization time calculated value indicates a time period required for performing the equalization on the to-be-equalized cell; and when it is determined that the to-be-equalized cell does not satisfy the equalization stopping condition, the second control unit is configured to: continue performing the equalization on the to-be-equalized cell, and finish the equalization until the time period during which the equalization is performed on the to-be-equalized cell satisfies the equalization time calculated value.

BRIEF DESCRIPTION OF THE DRAWINGS

The drawings illustrated herein are provided to provide a further understanding of the present disclosure, which constitutes a part of the present disclosure. The exemplary embodiments of the present disclosure and descriptions thereof are used to explain the present disclosure, and do not constitute an improper limitation of the present disclosure. In the drawings.

DETAILED DESCRIPTION

In order to make those skilled in the art to understand solutions of the present disclosure better, technical solutions in embodiments of the present disclosure will be described clearly and completely in the following with reference to the accompany drawings in the embodiments of the present disclosure. Apparently, the embodiments described herein are merely a part of the present disclosure, instead of all embodiments. All other embodiments obtained by those skilled in the art based on the embodiments in the present disclosure without creative labor shall fall in the protection scope of the present disclosure.

It should be noted that the terms "first", "second" and the like in the description and the claims of the present disclosure and the above-mentioned drawings are used to distinguish similar objects and are not necessarily used to describe a specific order or sequence. It should be understood that the data used as such may be interchanged where appropriate, such that the embodiments of the present disclosure described herein can be implemented in an order other than the order illustrated or described herein. In addition, the terms "comprise" and "have" and any variations thereof are intended to cover non-exclusive inclusions. For example, a process, method, system, product, or device including a series of steps or units are not necessarily to be limited to list those steps or units clearly, instead, other steps or units which are not explicitly listed or inherent to these processes, methods, products or devices may be included.

SoC refers to a state of charge, also known as surplus electric quantity, which represents a ratio of the remaining capacity of the battery which is used for a period of time or enters a standing state for a long time to the capacity of the battery in a fully charged state. The SoC is usually expressed by a percentage, ranging from 0 to 1. When SoC=0, the battery is fully discharged, and when SoC=1, the battery is fully charged.

Embodiment 1

According to embodiments of the present disclosure, a method embodiment of an equalization control method for a power battery is provided. It should be noted that the acts shown in the flow chart of the drawings may be performed in a computer system such as a set of computer-executable instructions. In addition, although a logical order is shown in the flow chart, in some cases, the illustrated or described steps may be performed in an order other than the order described herein.

Figure 1:
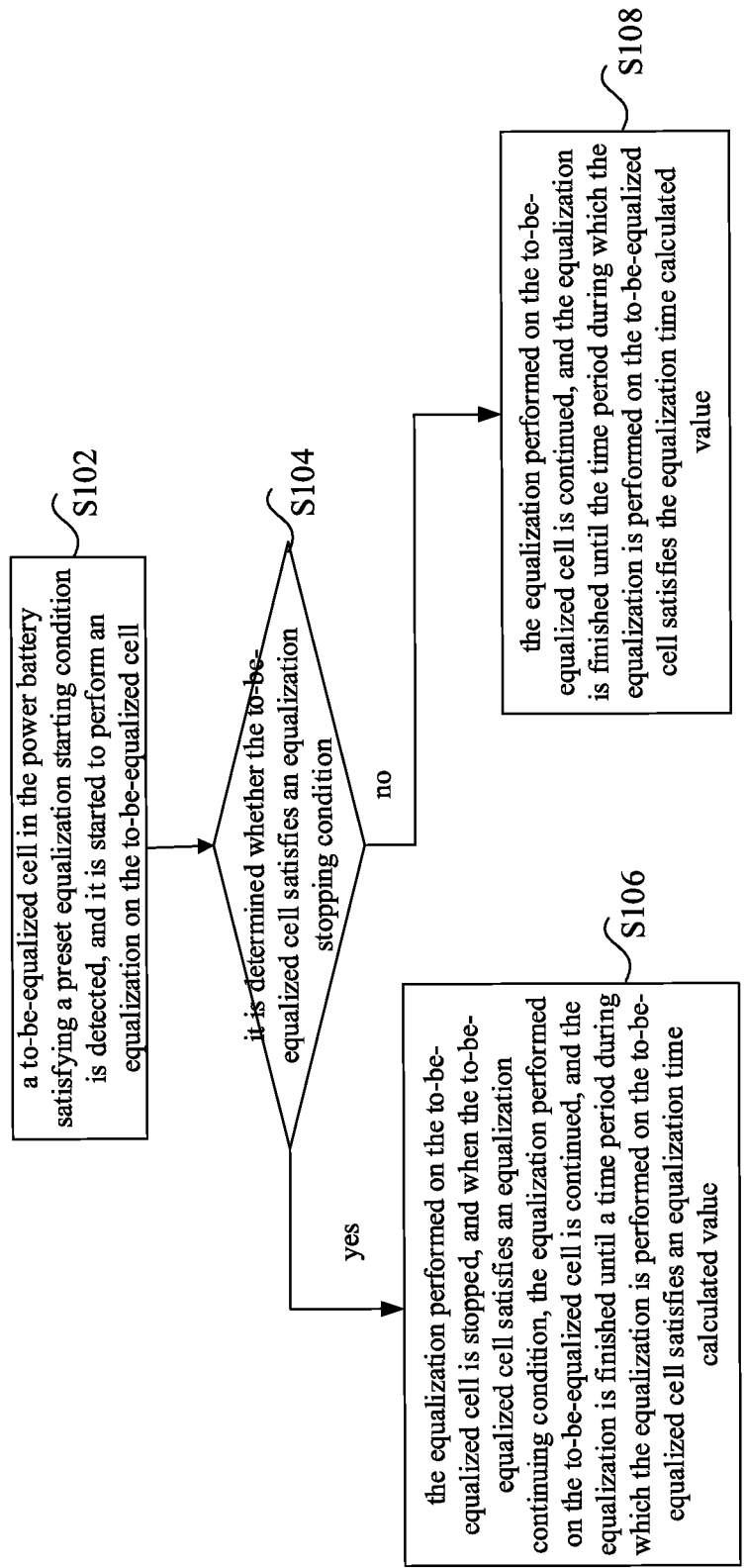
FIG. 1 is a flow chart of an equalization control method for a power battery according to an embodiment of the present disclosure.

FIG. 1 is a flow chart of an equalization control method for a power battery according to an embodiment of the present disclosure. As shown in FIG. 1, the equalization control method for the power battery includes followings.

At block S102, a to-be-equalized cell in the power battery satisfying a preset equalization starting condition is detected, and it is started to perform an equalization on the to-be-equalized cell.

At block S104, in a process of performing the equalization on the to-be-equalized cell, it is determined whether the to-be-equalized cell satisfies an equalization stopping condition.

At block S106, when it is determined that the to-be-equalized cell satisfies the equalization stopping condition, the equalization performed on the to-be-equalized cell is stopped, and when the to-be-equalized cell satisfies an equalization continuing condition, the equalization performed on the to-be-equalized cell is continued, and the equalization is finished until a time period during which the equalization is performed on the to-be-equalized cell satisfies an equalization time calculated value, in which the equalization time calculated value indicates a time period required for performing the equalization on the to-be-equalized cell.

At block S108, when it is determined that the to-be-equalized cell does not satisfy the equalization stopping condition, the equalization performed on the to-be-equalized cell is continued, and the equalization is finished until the time period during which the equalization is performed on the to-be-equalized cell satisfies the equalization time calculated value.

In this embodiment, after the equalization is started to be performed on the power battery, when the equalization stopping condition is satisfied, the equalization is stopped, and when the equalization continuing condition is satisfied, the stopped equalization is continued and the time period during which the equalization is performed is cumulated. The equalization time calculated value indicates a time period required for the power battery on which the equalization is performed reaching an equalization requirement. The equalization is finished when the cumulated equalization time satisfies the equalization time calculated value, i.e., the cumulated equalization time is regarded as a condition to measure whether the equalization is completed, such that the time period during which the equalization is performed on the power battery satisfies the equalization requirement of the power battery, and the power battery on which the equalization is performed may reduce the difference in electric quantity and voltage between the power battery cells. Technical problem of low equalization efficiency of the power battery is solved, thereby achieving an effect of improving the equalization efficiency of the power battery.

Alternatively, the following formula is used to calculate the equalization time calculated value.

$$T=(C*\Delta SoC*R)/U$$

where T represents the equalization time calculated value, U represents an open-circuit voltage, the unit of U is V, $\Delta SoC$ represents a difference between the minimum SoC value of another cell in the power battery and the minimum SoC value, the unit of $\Delta SoC$ is %, and R represents an equalization resistance, the unit of R is $\Omega$.

Alternatively, when the to-be-equalized cell satisfies the equalization continuing condition, continuing to perform the equalization includes: when the power battery is in a charging state, a discharging state or a standing state and the to-be-equalized cell satisfies the equalization continuing condition, continuing to perform the equalization on the to-be-equalized power battery. The equalization may be performed on the power battery in any state, which is not limited to the charging state, the discharging state or the standing state. However, in prior art, the equalization is only performed on the power battery in the standing state, and the equalization is finished by charging and discharging the power battery. Since the equalization time is short, the equalization effect is poor, thereby leading to a low equalization efficiency. By contrast, the time period for performing the equalization on the power battery in the solutions of this embodiment is relative long, the difference in electric quantity and voltage of the power battery cell satisfies an equalization requirement, and the equalization efficiency is improved.

Alternatively, detecting the to-be-equalized cell in the power battery satisfying the preset equalization starting condition and starting to perform the equalization on the to-be-equalized cell includes: detecting a standing time of the power battery, and determining whether the standing time of the power battery satisfies a preset standing time; when it is determined that the standing time of the power battery satisfies the preset standing time, acquiring SoC values of cells in the power battery, so as to acquire a cell corresponding to a minimum SoC value; determining whether the minimum SoC value is in a preset SoC value range; when the minimum SoC value is in the preset SoC value range, acquiring differences between SoC values of other cells in the power battery and the minimum SoC value, so as to start to perform the equalization on the to-be-equalized cell with a difference satisfying a preset difference, in which the to-be-equalized cell is a cell with higher electric quantity than the cell corresponding to the minimum SoC value; and when the minimum SoC value is not in the preset SoC value range, determining whether an equalization time interval reaches a preset time interval, and when the equalization time interval reaches the preset time interval, acquiring the differences between SoC values of other cells in the power battery and the minimum SoC value, so as to start to perform the equalization on the cell with high electric quantity and a difference satisfying the preset difference, in which the equalization time interval is a time interval between a current time and a completion time of the equalization performed last time.

Figure 2:
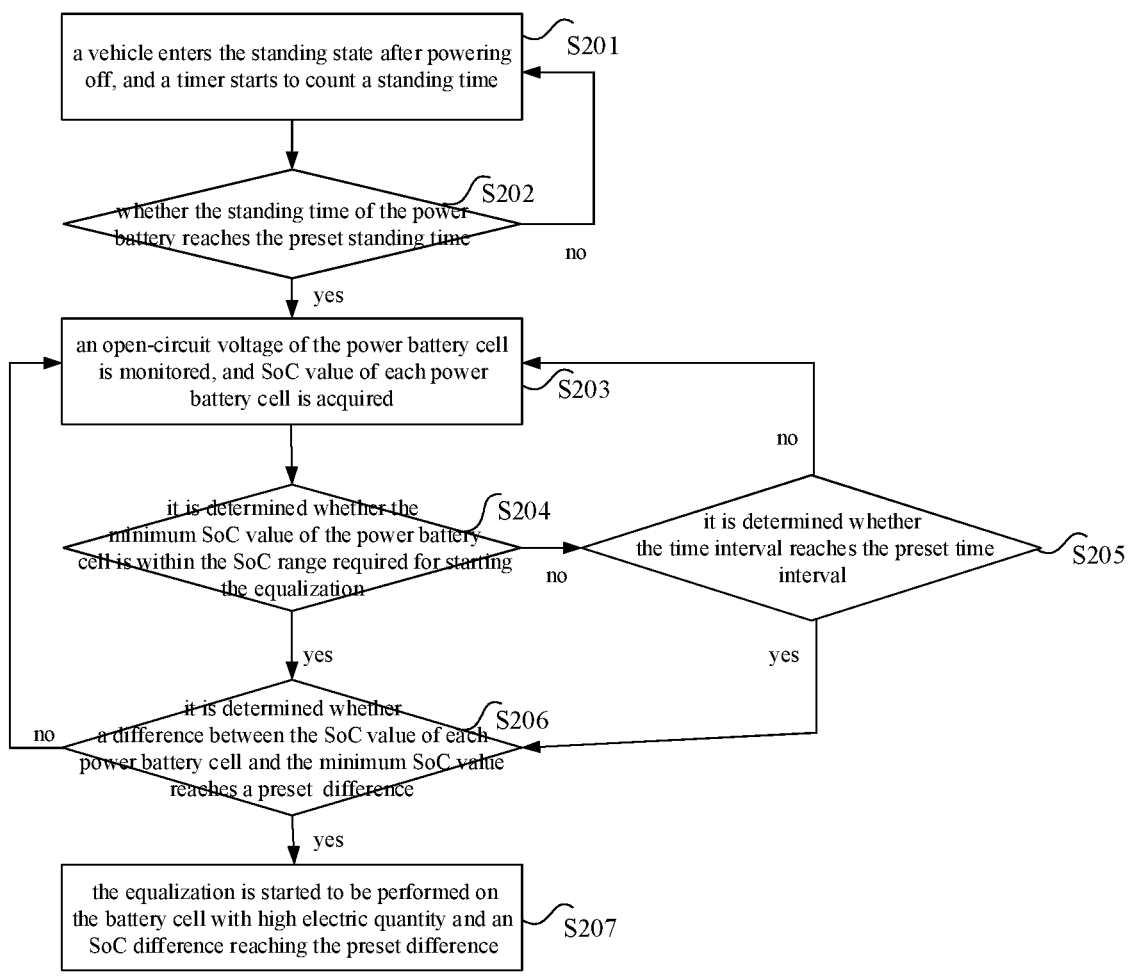
FIG. 2 is a flow chart of a starting process of a power battery according to an embodiment of the present disclosure.

Starting the equalization is performed during a process of the power battery entering the standing state, stopping and continuing the equalization may be performed during a process of the power battery entering the charging state, the discharging state or the standing state. The equalization continuing condition may be one or several of the equalization starting conditions. A process of starting to perform the equalization on the power battery will be described in the following with reference to FIG. 2.

At block S201, a vehicle enters the standing state after powering off, and a timer starts to count a standing time.

At block S202, the standing time of the power battery is compared with a preset equalization-starting standing time, so as to determine whether the standing time of the power battery reaches the preset standing time, and if the standing time of the power battery reaches the preset standing time, act in block S203 is performed, otherwise, act in block S201 is performed.

At block S203, an open-circuit voltage of the power battery cell is monitored, and SoC value of each power battery cell is acquired.

At block S204, the minimum SoC value of a power battery cell is compared with a preset equalization-starting SoC value, i.e., the minimum SoC value is compared with a preset SoC value range, and it is determined whether the minimum SoC value of the power battery cell is within the SoC range required for starting the equalization. If the minimum SoC value of the low power battery cell is within the SoC range required for starting the equalization, act in block S206 is performed, otherwise, act in block S205 is performed.

At block S205, in order to avoid that the equalization process cannot be started due to a charging habit of the user (for example, the user only uses fast charging and the like to charge for a long time), a time interval between a current time and a completion time of the equalization performed last time is compared with a preset equalization-starting time interval, so as to determine whether the time interval reaches the preset time interval. If the time interval reaches the preset time interval, act in block S206 is performed; otherwise, act in block S203 is performed.

At block S206, the SoC value of each power battery cell is compared with the minimum SoC value to determine whether a difference between the SoC value of each power battery cell and the minimum SoC value reaches a preset equalization-starting SoC difference. If the difference reaches the preset equalization-starting SoC difference, act in block S207 is performed; otherwise, it is jumped to perform act in block S203.

At block S207, the equalization is started to be performed on the battery cell with high electric quantity and an SoC difference reaching the preset difference. The battery cell with high electric quantity is a battery with higher electric quantity than the power battery cell with the lowest electric quantity among two power battery cells satisfying the preset difference.

In the above embodiment, during a process of starting the equalization, the equalization-starting standing time is in a range of 10 min to 3 h, preferably in a range of 30 min to 2 h. The preset equalization-starting SoC value is in a range of 30% to 100%, preferably in a range of 80% to 100%. The preset equalization-starting time interval is in a range of 500 h to 5000 h, preferably in a range of 1000 h to 3000 h. The preset equalization-starting SoC difference is in a range of 0.5% to 5%, preferably in a range of 1% to 2%.

Alternatively, when it is determined that the to-be-equalized cell satisfies the equalization stopping condition, stopping performing the equalization on the to-be-equalized cell may include: acquiring a current SoC value of the to-be-equalized cell; determining whether the current SoC value of the to-be-equalized cell reaches an equalization-stopping SoC value; when the current SoC value of the to-be-equalized cell reaches the equalization-stopping SoC value, stopping performing the equalization; and when the current SoC value of the to-be-equalized cell does not reach the equalization-stopping SoC value, determining whether the standing time of the to-be-equalized cell reaches an equalization-stopping standing time, and when the standing time of the to-be-equalized cell reaches the equalization-stopping standing time, stopping performing the equalization, in which the standing time of the to-be-equalized cell is a cumulated time from a time when the to-be-equalized cell enters into a standing state to a current time. The equalization-stopping standing time is a preset maximum time period to avoid under voltage due to a long standing time of the power battery cell, and the equalization-stopping SoC value is a preset maximum value to avoid an over-discharging of the battery.

A process of stopping to perform the equalization on the power battery will be described in the following with reference to FIG. 3.

At block S301, after the equalization is started to be performed on the power battery cell, an equalization loop is switched on (the equalization loop is connected), and a timer starts to count an equalization time.

At block S302, the SoC and the equalization time of the power battery are monitored, in which the equalization time includes a time period during which the equalization loop is switched on and a standing time of the power battery.

At block S303, in order to avoid an over-discharging of the battery due to a low SoC of the power battery in the equalization process, the SoC value of the power battery is compared with a preset equalization-stopping SoC value, so as to determine whether the SoC value of the power battery reaches the preset equalization-stopping SoC value. The preset equalization-stopping SoC value is the equalization-stopping SoC value. If the SoC value of the power battery reaches the preset equalization-stopping SoC value, it is jumped to perform act in block S305; otherwise, act in block S304 is performed.

At block S304, in order to avoid 12V under voltage of the vehicle due to a long standing time of the power battery, the standing time of the power battery is compared with the equalization-stopping standing time to determine whether the standing time of the power battery reaches the equalization-stopping standing time. If the equalization-stopping standing time is reached, act in block S305 is performed; otherwise, it is jumped to perform act in block S306.

At block S305, when the equalization-stopping standing time is reached, the equalization loop is switched off and the equalization performed on the power battery cell is stopped.

In the process of stopping to perform the equalization, the preset equalization-stopping SoC value is in a range of 0% to 30%, preferably in a range of 5% to 10%. The equalization-stopping standing time is in a range of 2 h to 10 h, preferable in a range of 2 h to 5 h.

Stopping performing the equalization when a stopping condition is satisfied may avoid an over-discharging of the battery due to a low SoC of the power battery in the equalization process and the 12V under voltage of the vehicle due to a long standing time of the power battery in the equalization process. Therefore, when the time period required for performing the equalization on the power battery is reached, problems including over-discharging and under voltage may be avoided, such that a service safety and a service lifetime of the power battery may be ensured.

Alternatively, when the to-be-equalized cell satisfies the equalization continuing condition, continuing to perform the equalization on the to-be-equalized cell, and finishing the equalization until the time period during which the equalization is performed on the to-be-equalized cell satisfies the equalization time calculated value may include: acquiring a cumulated equalization time of the to-be-equalized cell; determining whether the cumulated equalization time reaches the equalization time calculated value; when the cumulated equalization time reaches the equalization time calculated value, finishing the equalization; and when the cumulated equalization time does not reach the equalization time calculated value, performing the step of acquiring the current SoC value of the to-be-equalized cell.

When the standing time of the power battery does not reach the equalization-stopping standing time, or when the power battery is in a stopping state, the cumulated equalization time of the to-be-equalized cell is acquired. The cumulated equalization time is a time period during which the equalization has been performed within a time period from an equalization-starting time to an equalization-ending time. When the cumulated equalization time reaches the equalization time calculated value, it is determined that the equalization performed on the power battery is completed, and the equalization is finished to be performed on the power battery. When the cumulated equalization time does not reach the equalization time calculated value, the equalization is continued and the current SoC value of the to-be-equalized cell is re-acquired.

Figure 3:
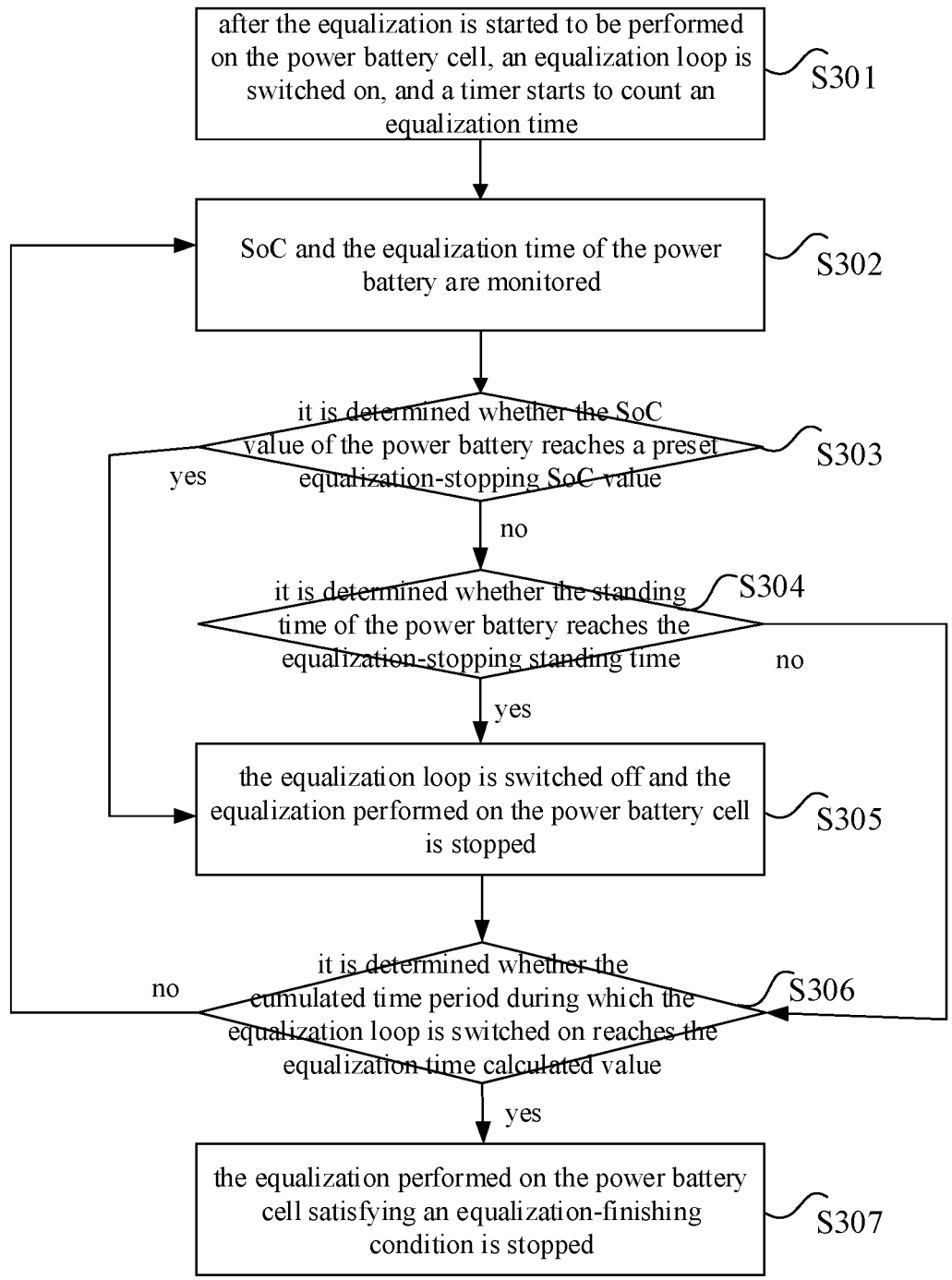
FIG. 3 is a flow chart of a stopping process of a power battery according to an embodiment of the present disclosure.

As shown in FIG. 3, the following acts are also included.

At block S306, the cumulated equalization time of the power battery is calculated, that is, a cumulated time period during which the equalization loop is switched on is compared with the equalization time calculated value to determine whether the cumulated time period during which the equalization loop is switched on reaches the equalization time calculated value. If the equalization time calculated value is reached, act in block S307 is performed; otherwise, it is jumped to perform act in block S302.

At block S307, the equalization performed on the power battery cell satisfying an equalization-finishing condition is stopped, and the current equalization is finished.

Alternatively, continuing to perform the equalization on the to-be-equalized cell may include: when the cumulated equalization time does not reach the equalization time calculated value, determining whether a state of the power battery is changed; when the state of the power battery is changed and the equalization continuing condition is satisfied, continuing to perform the equalization on the to-be-equalized cell, in which the equalization continuing condition includes: the minimum SoC value of the cell being in the preset SoC value range, or the differences between SoC values of other cells in the power battery and the minimum SoC value satisfying the preset difference.

If the power battery is in a standing state when the equalization is stopped, when the power battery enters a discharging state or a charging state, it is re-detected whether the equalization continuing condition is satisfied, and the equalization is continued when the equalization continuing condition is satisfied; or, if the power battery is in a charging state when the equalization is stopped, when the power battery enters a discharging state, it is re-detected whether the equalization continuing condition is satisfied, and the equalization is continued if the equalization continuing condition is satisfied.

Examples are taken as follows.

The power battery cell is a lithium-ion power battery with a capacity of 100 Ah and a charging/discharging voltage range of 2.7V to 4.2V. The equalization resistance of the equalization loop is 40Ω. A preset equalization-starting standing time is 2 h. A preset equalization-starting SoC range is 85 to 100%. An equalization-starting time interval is 3000 h. A preset equalization-starting SoC difference is 1%. An equalization-stopping SoC value is 5%. The equalization-stopping standing time is 3 h.

For example, the vehicle is charged slowly after finishing driving and enters the standing state after the charging is finished. When the charging is finished, the SoC value is 95%. The timer of an equalization apparatus starts timing. When the standing time reaches 2 h, a controller collects the open-circuit voltage data of the power battery via a battery state monitoring loop, so as to acquire SoC information of each power battery cell (the minimum SoC value of the power battery cell is 93%). At the same time, the difference between the SoC value of the power battery cell and the minimum SoC value of the power battery cell is calculated, in which the difference between the SoC value of a certain battery cell and the minimum SoC value reaches 1.2%, the open-circuit voltage of the battery cell is 4.1V, and the equalization time calculated value is 11.7 h. At this time, a control unit switches on (closes) an equalization loop switch of the power battery cell, the equalization is started, and it is started to count the equalization time. After the equalization is performed for 1 h, the equalization-stopping standing time is reached. At this time, the equalization loop switch is switched off (opened), the equalization is stopped, and the equalization time counting is stopped at the same time, and then the controller is powered off. After a period of time, the vehicle is powered on again and starts a normal driving. At this time, the SoC value of the equalized power battery cell is 94.1%, and the control unit switches on the equalization loop switch again, the equalization is restarted, and the equalization time counting is continued. During the driving process, the SoC value of the equalized power battery cell is reduced to 5%. At this time, the control unit switches off the equalization loop switch, the equalization is stopped and the equalization time counting is stopped at the same time. After that, the vehicle is charged, the SoC value of the equalized power battery cell reaches 5% again, the control unit switches on the equalization loop switch again, the equalization is restarted, and the equalization time counting is continued. When the cumulated equalization time reaches 12 h, the control unit switches off the equalization loop switch, and the current equalization process ends and the equalization time counting is finished.

For example, the vehicle is charged slowly after finishing driving and enters the standing state after the charging is finished. When the charging is finished, the SoC value is 80%. The timer of the equalization apparatus starts timing. When the standing time reaches 2 h, a controller collects the open-circuit voltage data of the power battery via a battery state monitoring loop, so as to acquire SoC information of each power battery cell (the minimum SoC value of the power battery cell is 79%). At the same time, the time interval between a current time and a completion time of the equalization performed last time reaches 3200 h, and the difference between the SoC value of the power battery cell and the minimum SoC value of the power battery cell is calculated, in which the difference between the SoC value of a certain battery cell and the minimum SoC value reaches 1.5%, the open-circuit voltage of the battery cell is 4.0V, and the equalization time calculated value is 15 h. At this time, a control unit switches on an equalization loop switch of the power battery cell, the equalization is started, and it is started to count the equalization time. After the equalization is performed for 1 h, the equalization-stopping standing time is reached. At this time, the equalization loop switch is switched off, the equalization is stopped, and the equalization time counting is stopped at the same time, and then the controller is powered off. After a period of time, the vehicle is powered on again and starts a normal driving. At this time, the SoC value of the equalized power battery cell is 80.4%, and the control unit switches on the equalization loop switch again, the equalization is restarted, and the equalization time counting is continued. The vehicle is charged after finishing driving and enters the standing state after the charging is finished. When the cumulated equalization time reaches 15 h, and the standing time is less than 3 h, the control unit switches off the equalization loop switch. The current equalization process ends and the equalization time counting is finished.

According to the above embodiment, the cumulated equalization time is regarded as a condition to measure whether the equalization is completed, such that the time period during which the equalization is performed on the power battery satisfies the equalization requirement of the power battery, and the power battery on which the equalization is performed may reduce the difference in electric quantity and voltage between the power battery cells. The technical problem of the low equalization efficiency of the power battery is solved, thereby achieving an effect of improving the equalization efficiency of the power battery. The equalization is stopped when the stopping condition is satisfied, which may prevent the battery from over-discharging due to a low SoC in the equalization process, and also prevent the vehicle from a 12V under voltage of a power supply due to a long standing time of the power battery in the equalization process. In the case that the equalization time reaches the time period required for the power battery, the problem of over-discharging and under voltage may also be avoided, such that the technical effect of ensuring the service safety and service lifetime of the power battery may be achieved.

Embodiment 2

According to an embodiment of the present disclosure, an embodiment of an equalization control circuit for a power battery is provided. The equalization control method for the power battery of Embodiment 1 may be realized by the equalization control circuit for the power battery of Embodiment 2.

Figure 4:
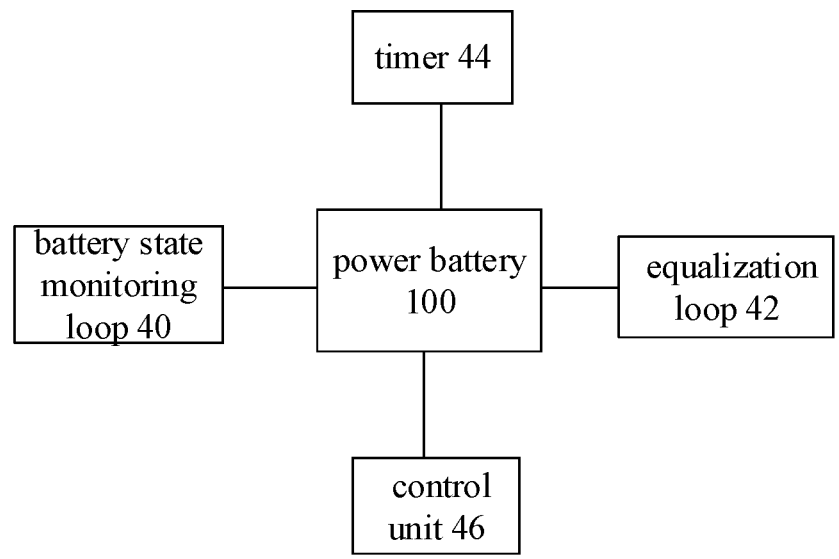
FIG. 4 is a schematic diagram of an equalization control circuit for a power battery according to an embodiment of the present disclosure.

As shown in FIG. 4, the equalization control circuit includes a battery state monitoring loop 40, an equalization loop 42, a timer 44, and a control unit 46.

The battery state monitoring loop 40 is coupled to the power battery 100 and configured to monitor SoC values of cells in the power battery 100.

The equalization loop 42 is coupled to the cells in the power battery in series and configured to perform an equalization on a to-be-equalized cell in the power battery.

The timer 44 is configured to count time.

The control unit 46 is coupled to the battery state monitoring loop, the equalization loop, the timer and the power battery, and configured to: control the equalization loop to perform the equalization on the to-be-equalized cell according to data monitored by the battery state monitoring loop and data acquired by the timer, when it is determined that the to-be-equalized cell satisfies an equalization stopping condition, switch off the equalization loop so as to stop performing the equalization on the to-be-equalized cell and switch on the equalization loop so as to continue to perform the equalization on the to-be-equalized cell when it is determined that the to-be-equalized cell satisfies an equalization continuing condition, and finish the equalization until the time period during which the equalization is performed on the to-be-equalized cell satisfies an equalization time calculated value, in which the equalization time calculated value indicates the time period required for performing the equalization on the to-be-equalized cell; when it is determined that the to-be-equalized cell does not satisfy the equalization stopping condition, switch on the equalization loop so as to continue performing the equalization on the to-be-equalized cell, and finish the equalization until the time period during which the equalization is performed on the to-be-equalized cell satisfies the equalization time calculated value.

In this embodiment, after the equalization is started to be performed on the power battery, the on-going equalization is stopped when the equalization stopping condition is satisfied. When the equalization continuing condition is satisfied, the stopped equalization is continued and the time period during which the equalization is performed is cumulated. The equalization time calculated value indicates a time period required for the power battery on which the equalization is performed reaching an equalization requirement. The equalization is finished when the cumulated equalization time satisfies the equalization time calculated value, i.e., the cumulated equalization time is regarded as a condition to measure whether the equalization is completed, such that the time period during which the equalization is performed on the power battery satisfies the equalization requirement of the power battery, and the power battery on which the equalization is performed may reduce the difference in electric quantity and voltage between the power battery cells. The technical problem of low equalization efficiency of the power battery is solved, thereby achieving an effect of improving the equalization efficiency of the power battery.

Since the structure of the equalization control circuit for the power battery is simple and convenient to be used in an equalization control of the power battery, an application cost is reduced and a practicability of the control circuit is improved.

Alternatively, the battery state monitoring loop includes: a voltage monitoring loop configured to monitor a voltage of the power battery, a current monitoring loop configured to monitor a current of the power battery and an internal resistance monitoring loop configured to monitor an internal resistance of the power battery, in which the voltage monitoring loop, the current monitoring loop and the internal resistance monitoring loop are coupled to the control unit. The voltage monitoring loop may monitor an open-circuit voltage of the power battery, the current monitoring loop may monitor the current in the power battery, and the internal resistance monitoring loop may monitor the resistance of the power battery, such that the control unit may calculate the equalization time calculated value of the to-be-equalized power battery cell according to data monitored by the above three loops.

Alternatively, the equalization loop includes an equalization resistor and a switch, in which the equalization resistor, the switch and the cells in the power battery are connected in series. The equalization loop is controlled to be connected or disconnected by switching on and off the switch. When the switch is switched on, the equalization loop is connected to perform the equalization on the to-be-equalized power battery cell; when the switch is switched off, the equalization loop is disconnected to stop performing the equalization on the to-be-equalized power battery cell.

Alternatively, the cells in the power battery are secondary batteries, and the secondary battery includes any of: a lead-acid battery, a nickel-metal hydride battery and a lithium ion battery.

With the above circuit, it is controlled to perform the equalization on the to-be-equalized power battery cell by switching on or off the equalization loop. The equalization time calculated value is calculated and acquired according to parameters of the to-be-equalized power battery cell, which reflect the equalization time required for the to-be-equalized power battery cell, such that the technical problem of the low equalization efficiency due to a short equalization time is avoided, thereby achieving a technical effect of improving the equalization efficiency.

Embodiment 3

According to an embodiment of the present disclosure, an embodiment of an equalization control apparatus for a power battery is provided. The equalization control apparatus for the power battery may perform the equalization control method for the power battery of Embodiment 1. The above method may also be performed by the apparatus.

Figure 5:
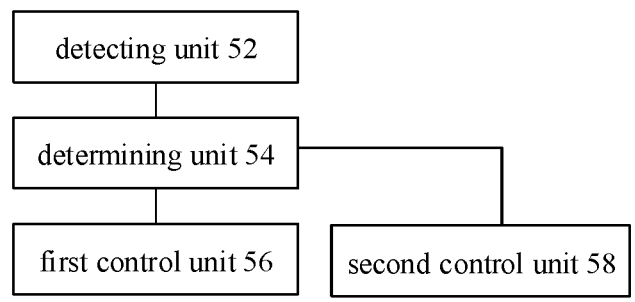
FIG. 5 is a schematic diagram of an equalization control apparatus for a power battery according to an embodiment of the present disclosure.

As shown in FIG. 5, the equalization control apparatus for the power battery includes a detecting unit 52, a determining unit 54, a first control unit 56 and a second control unit 58.

The detecting unit 52 is configured to detect a to-be-equalized cell in the power battery satisfying a preset equalization starting condition, and to start to perform an equalization on the to-be-equalized cell.

The determining unit 54 is configured to determine whether the to-be-equalized cell satisfies an equalization stopping condition in a process of performing the equalization on the to-be-equalized cell.

When it is determined that the to-be-equalized cell satisfies the equalization stopping condition, the first control unit 56 is configured to: stop performing the equalization on the to-be-equalized cell, and when the to-be-equalized cell satisfies an equalization continuing condition, continue to perform the equalization on the to-be-equalized cell, and finish the equalization until a time period during which the equalization is performed on the to-be-equalized cell satisfies an equalization time calculated value, in which the equalization time calculated value indicates a time period required for performing the equalization on the to-be-equalized cell.

When it is determined that the to-be-equalized cell does not satisfy the equalization stopping condition, the second control unit 58 is configured to: continue performing the equalization on the to-be-equalized cell, and finish the equalization until the time period during which the equalization is performed on the to-be-equalized cell satisfies the equalization time calculated value.

In this embodiment, after the equalization is started to be performed on the power battery, the on-going equalization is stopped when the equalization stopping condition is satisfied. When the equalization continuing condition is satisfied, the stopped equalization is continued and the time period during which the equalization is performed is cumulated. The equalization time calculated value indicates a time period required for the power battery on which the equalization is performed reaching an equalization requirement. The equalization is finished when the cumulated equalization time satisfies the equalization time calculated value, i.e., the cumulated equalization time is regarded as a condition to measure whether the equalization is completed, such that the time period during which the equalization is performed on the power battery satisfies the equalization requirement of the power battery, and the power battery on which the equalization is performed may reduce the difference in electric quantity and voltage between the power battery cells. The technical problem of the low equalization efficiency of the power battery is solved, thereby achieving an effect of improving the equalization efficiency of the power battery.

Alternatively, the following formula is used to calculate the equalization time calculated value.

$$T=(C*\Delta SoC*R)/U$$

where T represents the equalization time calculated value, U represents an open-circuit voltage, the unit of U is V, $\Delta SoC$ represents a difference between an SoC value of another cell in the power battery and the minimum SoC value, the unit of $\Delta SoC$ is %, and R represents an equalization resistance, the unit of R is $\Omega$.

The equalization may be performed on the power battery in any state, which is not limited to the charging state, the discharging state or the standing state. However, in prior art, the equalization is only performed on the power battery in the standing state, and the equalization is finished by charging and discharging the power battery. Since the equalization time is short, the equalization effect is poor, thereby leading to a low equalization efficiency. By contrast, the time period for performing the equalization on the power battery in the solutions of this embodiment is relative long, the difference in electric quantity and voltage of the power battery cell satisfies an equalization requirement, and the equalization efficiency is improved.

Stopping performing the equalization when a stopping condition is satisfied may avoid an over-discharging of the battery due to a low SoC of the power battery in the equalization process and the 12V under voltage of the vehicle due to a long standing time of the power battery in the equalization process. Therefore, when the time period required for performing the equalization on the power battery is reached, a problem of over-discharging and under voltage may be avoided, such that the technical effect of ensuring the service safety and service lifetime of the power battery may be achieved.

When the standing time of the power battery does not reach the equalization-stopping standing time, or when the power battery is in a stopping state, the cumulated equalization time of the to-be-equalized cell is acquired. The cumulated equalization time is a time period during which the equalization has been performed within a time period from an equalization-starting time to an equalization-ending time. When the cumulated equalization time reaches the equalization time calculated value, it is determined that the equalization performed on the power battery is completed, and the equalization is finished to be performed on the power battery. When the cumulated equalization time does not reach the equalization time calculated value, the equalization is continued and the current SoC value of the to-be-equalized cell is re-acquired.

The sequence numbers of the above embodiments are merely for description and do not represent a preference of the embodiments.

In the above embodiments of the present disclosure, the description of each embodiment has its own emphasis. For the part not described in detail in a certain embodiment, reference may be made to the relevant description of other embodiments.

In the several embodiments provided by the present disclosure, it should be understood that the disclosed technical content may be implemented in other manners. The device embodiments described above are merely schematic, for example, the division of the units may be a logical function division, and there may be another division manner during actual implementation, for example, multiple units or components may be combined or may be integrated into another system, or some features can be ignored or not to be implemented. In addition, the illustrated or discussed mutual coupling or direct coupling or communicating connection may be indirect coupling or communicating connection via some interfaces, units or modules, and may be in an electrical form and the like.

The units described as separate parts may or may not be physically separated, and the parts displayed as units may or may not be physical units, which may be located in one place, or may be distributed on multiple units. Some or all of the units may be selected according to actual needs to achieve the purpose of the solution of this embodiment.

In addition, each functional unit in each embodiment of the present disclosure may be integrated in a processing unit, or may physically exist as respective units, or two or more units may be integrated in one unit. The above integrated unit can be implemented either in hardware or in software.

If the integrated unit is implemented in the form of a software functional unit and sold or used as an independent product, the integrated unit may be stored in a computer-readable storage medium. Based on this understanding, the technical solution of the present disclosure, or the part of the technical solution of the present disclosure contributing to the prior art, or all or part of the technical solution is essentially presented in a form of a software product stored in a storage medium including several instructions for enabling a computer device (which may be a personal computer, a server, a network device, etc.) to perform all or part of the steps of the methods described in the various embodiments of the present disclosure. The foregoing storage medium includes: a USB disk, a Read-Only Memory (ROM), a Random Access Memory (RAM), a removable hard disk, a magnetic disk, an optical disk, or any other medium that can store program codes.

The above description is only a preferred embodiment of the present disclosure, and it should be pointed out that those skilled in the art can also make several improvements and remodeling without deviating from the principle of the present disclosure. These improvements and remodeling should be regarded as falling in the protection scope of the present disclosure.

What is claimed is:

1. An equalization control method for a power battery, comprising:
    detecting a to-be-equalized cell in the power battery satisfying a preset equalization starting condition, and starting to perform an equalization on the to-be-equalized cell;
    in a process of performing the equalization on the to-be-equalized cell, determining whether the to-be-equalized cell satisfies an equalization stopping condition;
    when it is determined that the to-be-equalized cell satisfies the equalization stopping condition, stopping performing the equalization on the to-be-equalized cell, and when the to-be-equalized cell satisfies an equalization continuing condition, continuing to perform the equalization on the to-be-equalized cell, and finishing the equalization until a time period during which the equalization is performed on the to-be-equalized cell satisfies an equalization time calculated value, in which the equalization time calculated value indicates a time period required for performing the equalization on the to-be-equalized cell; and
    when it is determined that the to-be-equalized cell does not satisfy the equalization stopping condition, continuing performing the equalization on the to-be-equalized cell, and finishing the equalization until the time period during which the equalization is performed on the to-be-equalized cell satisfies the equalization time calculated value.

2. The equalization control method according to claim 1, wherein detecting the to-be-equalized cell in the power battery satisfying the preset equalization starting condition and starting to perform the equalization on the to-be-equalized cell comprises:
    detecting a standing time of the power battery, and determining whether the standing time of the power battery satisfies a preset standing time;
    when it is determined that the standing time of the power battery satisfies the preset standing time, acquiring state of charge (SoC) values of cells in the power battery, so as to acquire a cell corresponding to a minimum SoC value;
    determining whether the minimum SoC value is in a preset SoC value range;
    when the minimum SoC value is in the preset SoC value range, acquiring differences between SoC values of other cells in the power battery and the minimum SoC value, so as to start to perform the equalization on the to-be-equalized cell with a difference satisfying a preset difference, in which the to-be-equalized cell is a cell with higher electric quantity than the cell corresponding to the minimum SoC value; and
    when the minimum SoC value is not in the preset SoC value range, determining whether an equalization time interval reaches a preset time interval, and when the equalization time interval reaches the preset time interval, acquiring the differences between SoC values of other cells in the power battery and the minimum SoC value, so as to start to perform the equalization on the cell with high electric quantity and a difference satisfying the preset difference, in which the equalization time interval is a time interval between a current time and a completion time of the equalization performed last time.

3. The equalization control method according to claim 2, wherein when it is determined that the to-be-equalized cell satisfies the equalization stopping condition, stopping performing the equalization on the to-be-equalized cell comprises:
    acquiring a current SoC value of the to-be-equalized cell;
    determining whether the current SoC value of the to-be-equalized cell reaches an equalization-stopping SoC value;
    when the current SoC value of the to-be-equalized cell reaches the equalization-stopping SoC value, stopping performing the equalization; and
    when the current SoC value of the to-be-equalized cell does not reach the equalization-stopping SoC value, determining whether the standing time of the to-be-equalized cell reaches an equalization-stopping standing time, and when the standing time of the to-be-equalized cell reaches the equalization-stopping standing time, stopping performing the equalization, in which the standing time of the to-be-equalized cell is a cumulated time from a time when the to-be-equalized cell enters into a standing state to a current time.

4. The equalization control method according to claim 2, wherein when the to-be-equalized cell satisfies an equalization continuing condition, continuing to perform the equalization on the to-be-equalized cell comprises:
    when the power battery is in any of a charging state, a discharging state and a standing state and the to-be-equalized cell satisfies the equalization continuing condition, continuing to perform the equalization on the to-be-equalized cell.

5. The equalization control method according to claim 1, wherein when it is determined that the to-be-equalized cell satisfies the equalization stopping condition, stopping performing the equalization on the to-be-equalized cell comprises:
    acquiring a current SoC value of the to-be-equalized cell;
    determining whether the current SoC value of the to-be-equalized cell reaches an equalization-stopping SoC value;
    when the current SoC value of the to-be-equalized cell reaches the equalization-stopping SoC value, stopping performing the equalization; and
    when the current SoC value of the to-be-equalized cell does not reach the equalization-stopping SoC value, determining whether a standing time of the to-be-equalized cell reaches an equalization-stopping standing time, and when the standing time of the to-be-equalized cell reaches the equalization-stopping standing time, stopping performing the equalization, in which the standing time of the to-be-equalized cell is a cumulated time from a time when the to-be-equalized cell enters into a standing state to a current time.

6. The equalization control method according to claim 5, wherein when the to-be-equalized cell satisfies the equalization continuing condition, continuing to perform the equalization on the to-be-equalized cell, and finishing the equalization until the time period during which the equalization is performed on the to-be-equalized cell satisfies the equalization time calculated value comprises:

acquiring a cumulated equalization time of the to-be-equalized cell;

determining whether the cumulated equalization time reaches the equalization time calculated value;

when the cumulated equalization time reaches the equalization time calculated value, finishing the equalization; and when the cumulated equalization time does not reach the equalization time calculated value, performing the step of acquiring the current SoC value of the to-be-equalized cell.

7. The equalization control method according to claim 6, wherein continuing to perform the equalization on the to-be-equalized cell comprises:

when the cumulated equalization time does not reach the equalization time calculated value, determining whether a state of the power battery is changed;

when the state of the power battery is changed and the equalization continuing condition is satisfied, continuing to perform the equalization on the to-be-equalized cell, in which the equalization continuing condition comprises at least one of:

the minimum SoC value of the cell being in the preset SoC value range, and the differences between SoC values of other cells in the power battery and the minimum SoC value satisfying the preset difference.

8. The equalization control method according to claim 1, wherein when the to-be-equalized cell satisfies an equalization continuing condition, continuing to perform the equalization on the to-be-equalized cell comprises:

when the power battery is in any of a charging state, a discharging state and a standing state and the to-be-equalized cell satisfies the equalization continuing condition, continuing to perform the equalization on the to-be-equalized cell.

9. The equalization control method according to claim 1, wherein the equalization time calculated value is calculated by:

$$T=(C*\Delta SoC*R)/U$$

where T represents the equalization time calculated value, U represents an open-circuit voltage, ΔSoC represents a difference between an SoC value of another cell in the power battery and a minimum SoC value, and R represents an equalization resistance.

10. An equalization control circuit for a power battery, comprising:

a battery state monitoring loop, coupled to the power battery, configured to monitor SoC values of cells in the power battery;

an equalization loop, coupled to the cells in the power battery in series, configured to perform an equalization on a to-be-equalized cell in the power battery;

a timer, configured to calculate a time period during which the equalization is performed on the to-be-equalized cell; and a control unit, coupled to the battery state monitoring loop, the equalization loop, the timer and the power battery, configured to:

control the equalization loop to perform the equalization on the to-be-equalized cell according to data monitored by the battery state monitoring loop and the time period required for performing the equalization on the to-be-equalized cell;

when it is determined that the to-be-equalized cell satisfies an equalization stopping condition, switch off the equalization loop so as to stop performing the equalization on the to-be-equalized cell and switch on the equalization loop so as to continue to perform the equalization on the to-be-equalized cell when it is determined that the to-be-equalized cell satisfies an equalization continuing condition, and finish the equalization until the time period during which the equalization is performed on the to-be-equalized cell satisfies an equalization time calculated value, wherein the equalization time calculated value indicates a time period required for performing the equalization on the to-be-equalized cell;

when it is determined that the to-be-equalized cell does not satisfy the equalization stopping condition, switch on the equalization loop so as to continue performing the equalization on the to-be-equalized cell, and finish the equalization until the time period during which the equalization is performed on the to-be-equalized cell satisfies the equalization time calculated value.

11. The equalization control circuit according to claim 10, wherein the battery state monitoring loop comprises:

a voltage monitoring loop configured to monitor a voltage of the power battery, a current monitoring loop configured to monitor a current of the power battery and an internal resistance monitoring loop configured to monitor an internal resistance of the power battery, in which the voltage monitoring loop, the current monitoring loop and the internal resistance monitoring loop are coupled to the control unit.

12. The equalization control circuit according to claim 10, wherein the equalization loop comprises an equalization resistor and a switch, in which the equalization resistor, the switch and the cells in the power battery are connected in series.

13. The equalization control circuit according to claim 10, wherein the cells in the power battery are secondary batteries, and the secondary battery comprises any of:

a lead-acid battery, a nickel-metal hydride battery and a lithium ion battery.

14. An equalization control apparatus for a power battery, comprising:

one or more processors;

a memory storing instructions executable by the one or more processors;

wherein the one or more processors are configured to:

detect a to-be-equalized cell in the power battery satisfying a preset equalization starting condition, and to start to perform an equalization on the to-be-equalized cell;

determine whether the to-be-equalized cell satisfies an equalization stopping condition in a process of performing the equalization on the to-be-equalized cell;

when it is determined that the to-be-equalized cell satisfies the equalization stopping condition, the one or more processors are configured to: stop performing the equalization on the to-be-equalized cell, and when the to-be-equalized cell satisfies an equalization continuing condition, continue to perform the equalization on the to-be-equalized cell, and finish the equalization until a time period during which the equalization is performed on the to-be-equalized cell satisfies an equalization time calculated value, wherein the equalization time calculated value indicates a time period required for performing the equalization on the to-be-equalized cell; and when it is determined that the to-be-equalized cell does not satisfy the equalization stopping condition, the one or more processors are configured to: continue performing the equalization on the to-be-equalized cell, and finish the equalization until the time period during which the equalization is performed on the to-be-equalized cell satisfies the equalization time calculated value.

15. The equalization control apparatus according to claim 14, wherein the one or more processors detect the to-be-equalized cell in the power battery satisfying the preset equalization starting condition and start to perform the equalization on the to-be-equalized cell by performing acts of:
  detecting a standing time of the power battery, and determining whether the standing time of the power battery satisfies a preset standing time;
  when it is determined that the standing time of the power battery satisfies the preset standing time, acquiring state of charge (SoC) values of cells in the power battery, so as to acquire a cell corresponding to a minimum SoC value;
  determining whether the minimum SoC value is in a preset SoC value range;
  when the minimum SoC value is in the preset SoC value range, acquiring differences between SoC values of other cells in the power battery and the minimum SoC value, so as to start to perform the equalization on the to-be-equalized cell with a difference satisfying a preset difference, in which the to-be-equalized cell is a cell with higher electric quantity than the cell corresponding to the minimum SoC value; and
  when the minimum SoC value is not in the preset SoC value range, determining whether an equalization time interval reaches a preset time interval, and when the equalization time interval reaches the preset time interval, acquiring the differences between SoC values of other cells in the power battery and the minimum SoC value, so as to start to perform the equalization on the cell with high electric quantity and a difference satisfying the preset difference, in which the equalization time interval is a time interval between a current time and a completion time of the equalization performed last time.

16. The equalization control apparatus according to claim 14, wherein when it is determined that the to-be-equalized cell satisfies the equalization stopping condition, the one or more processors stop performing the equalization on the to-be-equalized cell by performing acts of:
  acquiring a current SoC value of the to-be-equalized cell;
  determining whether the current SoC value of the to-be-equalized cell reaches an equalization-stopping SoC value;
  when the current SoC value of the to-be-equalized cell reaches the equalization-stopping SoC value, stopping performing the equalization; and
  when the current SoC value of the to-be-equalized cell does not reach the equalization-stopping SoC value, determining whether a standing time of the to-be-equalized cell reaches an equalization-stopping standing time, and when the standing time of the to-be-equalized cell reaches the equalization-stopping standing time, stopping performing the equalization, in which the standing time of the to-be-equalized cell is a cumulated time from a time when the to-be-equalized cell enters into a standing state to a current time.

17. The equalization control apparatus according to claim 16, wherein when the to-be-equalized cell satisfies the equalization continuing condition, the one or more processors continue to perform the equalization on the to-be-equalized cell, and finish the equalization until the time period during which the equalization is performed on the to-be-equalized cell satisfies the equalization time calculated value by performing acts of:
  acquiring a cumulated equalization time of the to-be-equalized cell;
  determining whether the cumulated equalization time reaches the equalization time calculated value;
  when the cumulated equalization time reaches the equalization time calculated value, finishing the equalization; and
  when the cumulated equalization time does not reach the equalization time calculated value, performing the step of acquiring the current SoC value of the to-be-equalized cell.

18. The equalization control apparatus according to claim 17, wherein the one or more processors continue to perform the equalization on the to-be-equalized cell by performing acts of:
  when the cumulated equalization time does not reach the equalization time calculated value, determining whether a state of the power battery is changed;
  when the state of the power battery is changed and the equalization continuing condition is satisfied, continuing to perform the equalization on the to-be-equalized cell, in which the equalization continuing condition comprises at least one of:
  the minimum SoC value of the cell being in the preset SoC value range, and the differences between SoC values of other cells in the power battery and the minimum SoC value satisfying the preset difference.

19. The equalization control apparatus according to claim 14, wherein when the to-be-equalized cell satisfies an equalization continuing condition, the one or more processors continue to perform the equalization on the to-be-equalized cell by performing acts of:
  when the power battery is in any of a charging state, a discharging state and a standing state and the to-be-equalized cell satisfies the equalization continuing condition, continuing to perform the equalization on the to-be-equalized cell.

20. The equalization control apparatus according to claim 14, wherein the equalization time calculated value is calculated by:

$$T=(C*\Delta SoC*R)/U$$

where T represents the equalization time calculated value, U represents an open-circuit voltage, $\Delta SoC$ represents a difference between an SoC value of another cell in the power battery and a minimum SoC value, and R represents an equalization resistance.

* * * * *